(12) United States Patent
Dean et al.

(10) Patent No.: US 8,414,301 B2
(45) Date of Patent: Apr. 9, 2013

(54) ADJUSTABLE MULTI-SENSORY FLY CASTING TRAINER AND TEACHING METHOD

(76) Inventors: Floyd D. Dean, Sausalito, CA (US); Janet F. Dean, Sausalito, CA (US)

(*) Notice: Subject to any disclaimer, the term of this patent is extended or adjusted under 35 U.S.C. 154(b) by 93 days.

(21) Appl. No.: 12/978,128

(22) Filed: Dec. 23, 2010

(65) Prior Publication Data

US 2011/0212423 A1    Sep. 1, 2011

Related U.S. Application Data

(63) Continuation of application No. PCT/US2009/003781, filed on Jun. 24, 2009.

(60) Provisional application No. 61/133,107, filed on Jun. 24, 2008.

(51) Int. Cl.
    *G09B 9/00*    (2006.01)

(52) U.S. Cl. ........................................ 434/247

(58) Field of Classification Search .................. 434/247, 434/252, 433; 473/219, 223, 224, 234, 457, 473/464; 446/347, 408, 418–421
See application file for complete search history.

(56) References Cited

U.S. PATENT DOCUMENTS

| | | | | |
|---|---|---|---|---|
| 2,544,128 A * | 3/1951 | Bell | | 472/137 |
| 3,946,518 A * | 3/1976 | Ylitalo | | 446/266 |
| 5,334,027 A * | 8/1994 | Wherlock | | 434/247 |
| 5,360,209 A * | 11/1994 | Mollica | | 473/457 |
| 5,590,875 A * | 1/1997 | Young | | 473/457 |
| 5,711,718 A * | 1/1998 | Mueller | | 473/234 |
| 5,713,792 A * | 2/1998 | Ohzono et al. | | 463/7 |
| 6,022,025 A * | 2/2000 | Chuang | | 273/448 |
| 6,412,211 B1 * | 7/2002 | Smith | | 43/4 |
| 6,461,163 B1 * | 10/2002 | Gallagher et al. | | 434/252 |
| 6,517,438 B2 * | 2/2003 | Tosaki et al. | | 463/37 |
| 6,763,628 B1 * | 7/2004 | Bartlett | | 43/4 |
| 6,949,036 B2 * | 9/2005 | Ciesar et al. | | 473/457 |
| 6,955,610 B1 * | 10/2005 | Czaja et al. | | 473/256 |
| 7,113,166 B1 * | 9/2006 | Rosenberg et al. | | 345/156 |
| 7,147,580 B2 * | 12/2006 | Nutter et al. | | 473/457 |
| 7,226,371 B2 * | 6/2007 | Leadbetter et al. | | 473/409 |
| 7,297,078 B2 * | 11/2007 | Libonati | | 473/457 |
| 7,618,328 B2 * | 11/2009 | Davenport et al. | | 473/257 |
| 2002/0148154 A1 * | 10/2002 | Merritt | | 43/4 |

* cited by examiner

*Primary Examiner* — Kurt Fernstrom
(74) *Attorney, Agent, or Firm* — Michael S. Lemley (57) ABSTRACT

A fly casting training apparatus includes a shaft, a ball movable within the shaft, and adjustable limit stops for setting the range of motion of the ball within the shaft. The apparatus is used to simulate a fly casting experience, with the limit stops adjustable to simulate long casting motions, short casting motions, and casting motions therebetween. The device also includes an elastic band that may be used to simulate the double haul casting method.

15 Claims, 9 Drawing Sheets

ADJUSTABLE MULTI-SENSORY FLY CASTING TRAINER AND TEACHING METHOD

RELATED APPLICATIONS

This patent application claims the benefit of PCT International Application PCT/US09/03781 filed Jun. 24, 2009, which claims the benefit of U.S. Provisional Patent Application No. 61/133,107 filed Jun. 24, 2008.

FIELD

The present invention relates to fly fishing and more particularly to an adjustable multi-sensory fly casting trainer and method of teaching that enables a fly casting student to learn fly casting strokes through visual, auditory and tactile information given by the adjustable multi-sensory fly casting trainer.

BACKGROUND

Fly-casting is an artful form of fishing that has proven popular through the years. One goal of the fly casting stroke is to deliver a weightless fly to a targeted location or fish. The proper fly-casting stroke involves the transfer of energy from the loaded (bent) fly rod to the fly line, causing the line to form a loop that will then pass through the air to deliver the fly to the desired location. To transfer this energy; the fly caster accelerates the fly rod through the casting stroke and then, stops the rod so that the energy from the bent rod transfers to the fly line causing it to form a loop and fly through the air. There is a forward cast and a back cast as the fly rod is moved back and forth. The caster must learn to wait while the line unrolls behind him on his back cast before accelerating the fly rod into the forward stroke.

There is also a casting method known as the double haul that is used to add line speed to the casting stroke and thus add distance to the fly cast. To accomplish the double haul, the caster pulls down on the fly line in both the forward and backward casting stroke, causing more bend or load in the fly rod to thereby increase the energy that can be transferred to the fly line. The caster then releases the fly line, causing the fly to travel a longer distance. Since the fly line is essentially weightless and cannot be thrown, the fly caster must master the components of a good fly casting stroke in order to deliver the fly to the desired location. The components of a fly casting stroke include, among other things, making a smooth acceleration to a positive controlled stop, in both the forward and back cast, with proper timing and speed. Performing the double haul requires the additional coordination of the fly rod stroke with the timing and speed of pulling and releasing the fly line to load and release the fly rod for extra distance of the fly cast.

There have been prior attempts to develop aids for fly-casting. For example, U.S. Pat. No. 6,763,628 discloses a handle that can be attached to a fly rod. The handle provides a means for an instructor to grip the fly rod in concert with a fly casting student in order for the instructor to impart his muscle memory of the casting stroke to the student. This might be useful during a fly-casting lesson with an instructor. However, a training device that the student can take home, use indoors or outdoors, and in winter or summer, would add significant training time for a fly casting student to develop the proper muscle memory for a good fly-casting stroke. In addition, the casting stroke must be adjusted to accomplish casting different lengths of line. A short casting stroke is used to cast a short length of fly line and a longer casting stroke is used to cast greater distances. With an adjustable multi-sensory fly casting trainer, the student can adjust the fly casting trainer apparatus to practice the casting stroke for various lengths of line.

The double haul is an advanced fly-casting technique employed to add line speed so that greater lengths of line can be cast. It is often necessary to cast greater lengths of line when fishing large bodies of water such as wide rivers, lakes and the ocean. The timing and smoothness of a well-formed double haul cast are, therefore, beneficial for a fly fisherman to learn.

SUMMARY OF INVENTION

It is an object of the present invention to provide a fly cast training apparatus that includes an elongated member and a movable member movably attached to the elongated member, the movable member movable along the axis of the elongated member from a first position to a second position. The movable member moves along the axis of the elongated member in response to a fly casting motion imparted on the elongated member by the user, the motion of the movable member simulating the timing of fly line being cast during a fly casting stroke.

It is also an object of the present invention to provide a fly casting trainer that when moved properly through the fly casting stroke, will give the fly casting student auditory, visual and tactile signals that the fly casting student is making the proper casting stroke, including, for example, the proper amount of acceleration through the casting stroke, proper stop at the end of the casting stroke, and proper wait time in the back and forward cast so that when duplicating the stroke with an actual fly rod, there will be time for the loop of the fly line to unroll properly in the air.

It is also an object of the present invention to provide an adjustable fly casting trainer that includes a first elongated member, a second elongated member coaxial with the first elongated member and axially movable relative to the first elongated member, and a movable member movably attached to the second elongated member, the movable member movable back and forth along the axis of the second elongated member between a first limit position and a second limit position, wherein the axial location of the second elongated member relative to the first elongated member affects the relative distance between the first limit position and the second limit position.

The present invention also includes a method for teaching fly-casting using the above-described fly-casting trainer. The method comprises teaching the fly casting student, through any suitable medium, such as through written description, illustrated instruction, DVD or other video format, live demonstration, or other methods of teaching how to use the visual, auditory and tactile feedback of the fly casting trainer to develop proper fly casting techniques. For example, the fly cast student should accelerate the trainer through the casting stroke so that when the student stops the stroke, the student should hear two clicks. A first click as the fly cast trainer stops (as the moveable member moves axially to a distal position of the elongated member) and a second click as the movable member returns axially to the proximal position of the elongated member, thereby indicating to the user to accelerate the trainer into the forward or backward stroke as the case may be.

BRIEF DESCRIPTION OF DRAWINGS

Other objects, features, and advantages of the present invention will become more apparent from the following detailed description of the preferred embodiments and certain modifications thereof when taken together with the accompanying drawings in which.

DESCRIPTION OF EMBODIMENTS

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "connected," "supported," and "coupled" and variations thereof are used broadly and encompass both direct and indirect mountings, connections, supports, and couplings. Further, "connected" and "coupled" are not restricted to physical or mechanical connections or couplings, but can include, for example, electrical and fluid connections or couplings.

Although directional references, such as upper, lower, downward, upward, rearward, bottom, front, rear, etc., may be made herein in describing the drawings, these references are made relative to the drawings (as normally viewed) for convenience. These directions are not intended to be taken literally or limit the present invention in any form. In addition, terms such as "first", "second", and "third" are used herein for purposes of description and are not intended to indicate or imply relative importance or significance.

Figure 1:
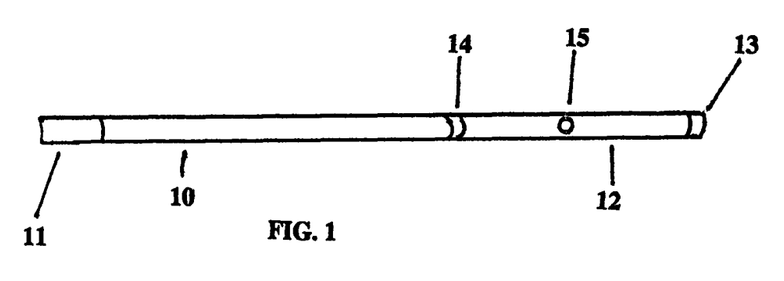
FIG. 1 is a plan view of a fly cast training apparatus according to one embodiment of the invention.

FIG. 1 shows a fly cast training apparatus 1 having an elongated body 10 with proximal end 11 that can be gripped or held as a handle, a distal end 12 that has a plug or end cap 13, a stop mechanism 14 such as a plug or stop screw, and a movable element 15 that moves, slides, rolls, or otherwise translates relative to the elongated body 10 by the dynamic forces of motion from moving the fly casting training apparatus 1 in a fly casting motion and by the force of gravity.

According to one embodiment of the fly cast training apparatus 1, the elongated body 10 is a clear polycarbonate tube and the movable element 15 is a round ball sized to fit within the tube and roll, slide or otherwise move freely in the axial direction within the tube. The proximal end 11 may be contiguous with the elongated body 10 or may optionally have a handle attached and/or incorporated onto the elongated body 10, such as a golf grip, fly rod handle, fishing rod handle, or other convenient handle for gripping the fly casting trainer 1.

Figures 2, 3:
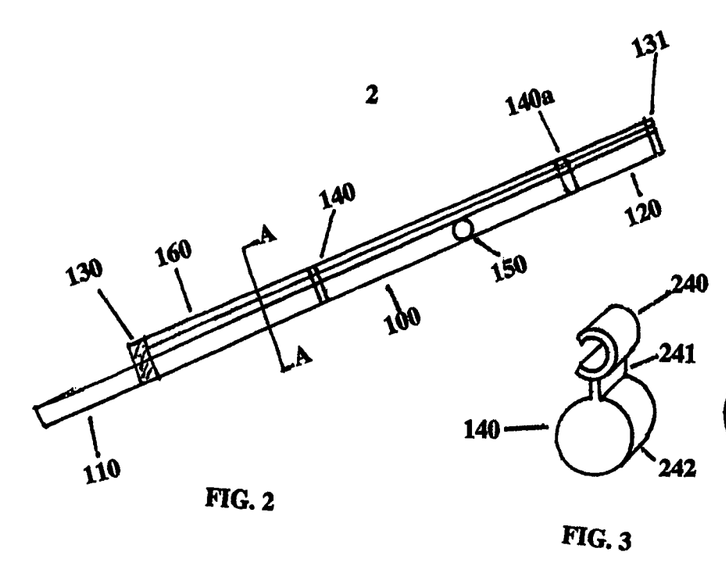
FIG. 2 is a plan view of an adjustable fly cast training apparatus according to another embodiment of the present invention.
FIG. 3 shows a perspective view of a stop mechanism for the embodiment of FIG. 2.
Figure 4:
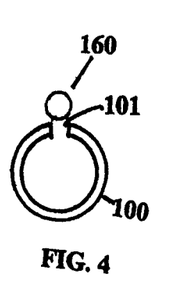
FIG. 4 shows an section view of the embodiment of FIG. 2 at A-A.

FIG. 2 shows an alternative embodiment of the fly casting trainer 2 that includes an elongated body 100 in the form of a hollow tube with a gap 101 (as shown in FIG. 4) along a portion of the length of the elongated body 100. The proximal end 110 may gripped as a handle or may be adapted to include a handle as discussed above. A rod 160 is attached to the elongate body 100 by clip 130 toward or at the distal end 120 and clip 131 toward or at the proximal end 110, to hold the rod 160 and elongated body 100 in a substantially parallel arrangement wherein the rod 160 is arranged adjacent to the gap 101. Adjustable stop mechanisms 140, 140a are adjustably attached to the rod 160. The stop mechanisms 140, 140a protrude through the gap 101 and into the elongated body 100 so that a stop plug portion 242 (see FIG. 3) of the stop mechanism 140, 140a is located within the elongated body 100 and is affective to limit the axial motion of the movable element 150 between the two stop mechanisms 140, 140a.

The stop mechanisms 140, 140a, as shown in FIG. 3 have a clamp section 240 that is operable to engage the rod 160. Extender 241 of the stop mechanism 140 extends from the clamp section 240 to the stop plug 242, and is sized to slidably fit within gap 101 of the elongated body 100. The stop plug 242 provides the barrier within the elongated body 100 that limits the axial motion of the movable element 150. The clamp section 240 may be a slide fit on the rod 160, allowing the user to slide the stop mechanism 140, 140a axially along the elongated body 100 to achieve the desired cast adjustment (e.g. long, medium, short, or anywhere therebetween). Alternatively, the clamp section 240 could include a set screw or other suitable securing method to hold the stop mechanism 140, 140a in position on the rod 160.

As shown in FIG. 4, a section through A-A of FIG. 2, the rod 160 is arranged adjacent to gap 101 of the elongated body 100 in order to provide a configuration that allows the stop mechanism 140, 140a to attach to rod 160 and protrude through gap 101 into the interior of elongated body 100.

Figure 5:
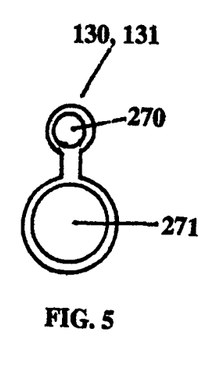
FIG. 5 shows a plan view of an end clamp for the embodiment of FIG. 2.

FIG. 5 shows a plan view of clips 130, 131 which are used to hold rod 160 in position relative to elongated body 100. Rod 160 may be press fit into opening 270 and elongated body 100 may be press fit into opening 271.

Figure 6:
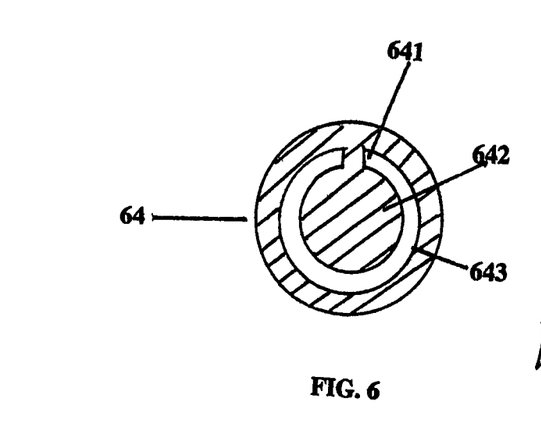
FIG. 6 shows a cross-section of a stop mechanism for the tube body of FIG. 7.
Figure 7:
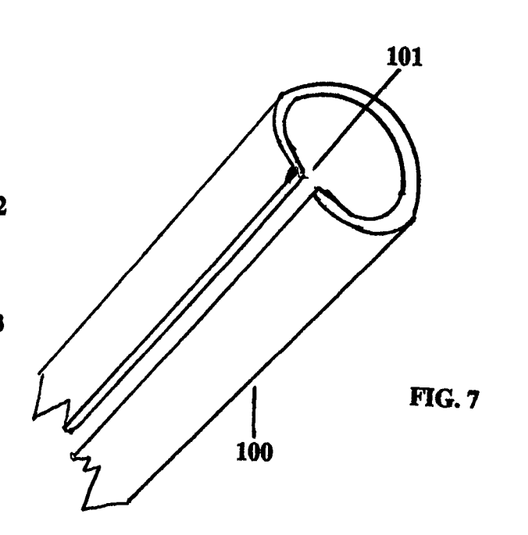
FIG. 7 shows a partial view of the tube body for an alternative embodiment of the invention.

FIG. 6 shows an alternative embodiment of a stop mechanism 64. A fly casting trainer according to the embodiment using two stop mechanisms 64 does not include a rod 160, but rather, as shown in FIG. 7, is designed to operate with elongated body 100 with a gap 101 along at least a part of the length of elongated member 100. Each stop mechanism 64 may be positioned with stop plug 642 on the interior of elongated body 100 with connector 641 connecting the outer ring portion 644 to stop plug 642. Stop mechanism 64 thus slides with connector 641 guided within gap 101 of the elongated body 100. The inner surface 643 of the stop mechanism 64 is sized to slidably press fit around elongated body 100 to thereby hold stop mechanism 64 in the user-adjustable location along the length of the elongated body 100. The positions of stop mechanisms 64 set the limits of motion within the elongated body 100 of the movable member 150.

According to a further embodiment of the invention, the movable member 150 is a ring or other shape that coincides with the outer surface of the elongated body 100, and the movable member 150 slides or translates on the outside surface of the elongated body 100. In this case, the elongated body 100 may be hollow or solid. The movable member 150 may be adapted to include ball bearings or other suitable friction reduction means to improve slidability of the movable member 150 on the elongated body 100. In such an arrangement, the stop mechanisms may attach on the outside surface of the elongated body 100, and therefore, suitable stop mechanisms may include clamps or other mechanisms as commonly known for attaching to tubes, pipes, dowels, or other such structures as may be used for the elongated member 100.

Figure 8:
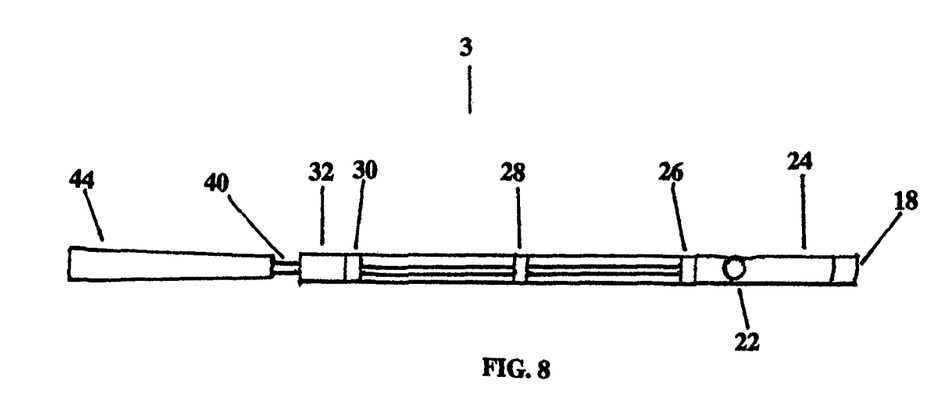
FIG. 8 shows a plan view of an adjustable fly casting apparatus according to one embodiment of the present invention in the short cast position.

FIG. 8 shows an alternative embodiment of an adjustable fly casting trainer 3. Generally, in the preferred embodiment, the device comprises an outer tube 24 and a piston shaft 40 with a friction brake 32. The piston shaft 40 is adjustable along a common axis with the outer tube 24, such that the piston shaft 40 telescopically moves in and out of the outer tube 24. Upper and lower bushings 36 and 34 help provide a smooth translation of the piston shaft 40 relative to the outer tube 24. According to one embodiment, bushing 36 is fixed to the distal end of the piston shaft 40 and slides relative to the outer tube 24, and bushing 34 slides relative to the piston shaft 40 and is fixed to the proximal end of the outer tube 24. A handle 44 may be used to grip the fly casting trainer 3. A ball 22 is freely movable within the outer tube 24, and the ball 22 moves in response to the casting action of the fly casting trainer 3 imparted by a user. The ball 22 will also move in response to the force of gravity. A metal screw or bolt 38 at the distal end of the piston shaft 40 and a metal nut 20 (or other suitable material) at the distal end of the outer tube 24 act as stops the ball 22, and provide audible sounds upon contact by the ball 22. A cap 18 is on the distal end of the outer tube 24. An elastic band 46, which emulates the fly line in the double haul casting motion, may be created from sections of smaller elastic or rubber bands, surgical tubing, elastic or rubber strap, or any other material that is flexible enough to be pulled and that will retract up as a fly line does when accomplishing a double hauling motion. The elastic band 46 is attached above the handle 44 to simulate the fly line while making the double haul motion.

There may optionally be markings 26, 28, 30 on the outer tube 24 indicating the short, medium or long distance, respectively, of the fly cast that is being simulated. The outer tube 24 may be of plastic, PVC, fiberglass, graphite, aluminum, steel or polycarbonate or any other known materials. The piston shaft 40 may be hollow or solid and may be of any suitable material such as wooden dowel, aluminum rod, steel rod, acrylic, or any other material. The adjustable brake 32 may be of a twist, cam, friction variety or any other device that can hold two pieces of tubing and piston shaft together and allow for re-positioning. The bushings 34, 36 can be made of cork, plastic, PVC, rubber or plastic hose, or any material that will stabilize the piston 40 in the outer tube 24. The ball 22 may be, for example, a standard ½ inch ball bearing or any material that can slide either inside or outside of a rod or tube. For example, the ball 22 may be any other movable element as discussed above, such as a ring of suitable material that is sized to slide over the outer tube 24, as opposed to being inside the outer tube 24. The stops 20, 38 may be any form of metal or plastic or any material that the ball 22 or other sliding or rolling device 150 can hit against to make a sound which provides the auditory sensory feedback to the user. The handle 44 may be a standard golf grip, a standard fly rod grip or any other grip or handle that can be attached to a shaft, rod or tube. There may be various embodiments to this invention. The adjustable multi-sensory fly casting trainer maybe attached to a conventional fly rod. A rod tip with guides and fly line may be added to the trainer. A ferrule or other connector may be inserted into the end of the trainer so that a fly rod or parts of a fly rod can be attached. A line and reel may be attached to the trainer. The trainer may be of any size or length to simulate various sizes and lengths or weights of fly rods.

As shown in FIG. 8, the fly casting apparatus 3 is in the short casting position. A significant portion of the piston shaft 40 is inside the outer tube 40, and the ball 22 has a short range of motion between the end cap 18 and the distal end of the piston shaft 40, which the ball 22 will move through in response to the user fly casting motion of the trainer.

Figure 9:
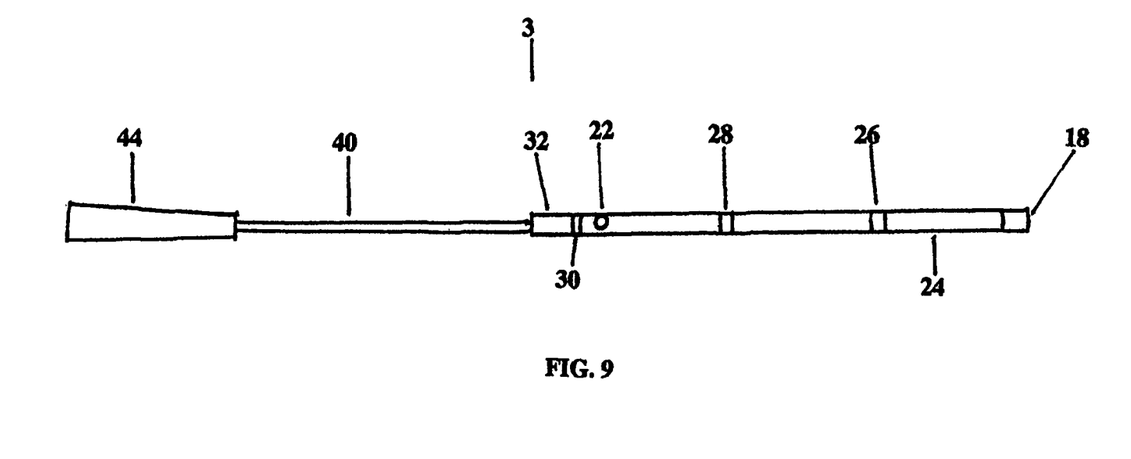
FIG. 9 shows a plan view of the embodiment of FIG. 8 in the long cast position.

FIG. 9 shows a plan view of the embodiment of FIG. 8 in the long cast position. In the long cast position, the piston shaft 40 is withdrawn from the outer tube 24, and the ball 22 has a greater length of travel within the outer tube 24 during the user's casting motion. The user may adjust the fly casting training apparatus 3 so that the piston shaft 40 is in any position between the two extreme positions of the long casting position 30 and the short casting position 26.

Figure 10:
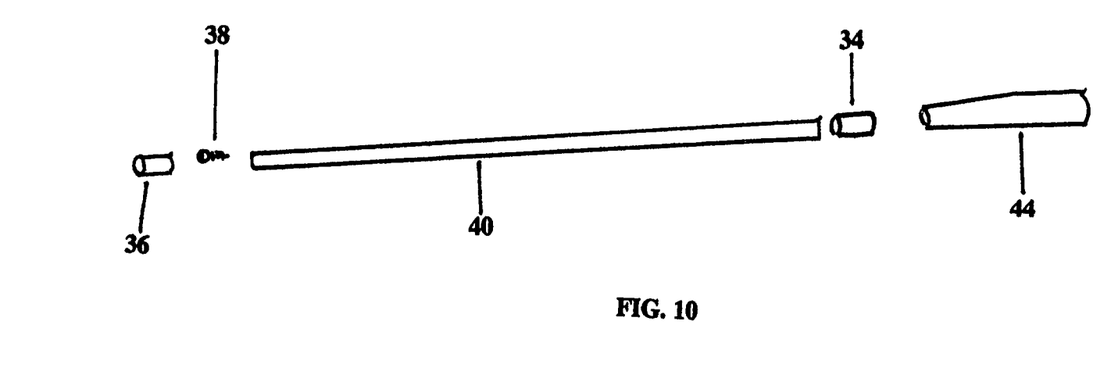
FIG. 10 is an exploded perspective view of a first section of the embodiment of the adjustable fly casting apparatus shown in FIG. 8.

FIG. 10 shows an exploded perspective view of the piston shaft 40, handle 44, bottom bushing 34, stop screw 38, and top bushing 36. The stop screw 38 is screwed into the tip of the piston shaft 40 so that when the ball 22 hits against it, the fly-casting student will hear a click. The top bushing 36 fits over the piston shaft 40 and may be glued into place so that the piston shaft 40 will slide evenly inside the outer tube 24. The bottom bushing 34 also guides the piston shaft 40 evenly through the outer tube 24 and may also be glued into place. The handle 44 may be glued or otherwise attached to the piston shaft 40.

Figure 11:
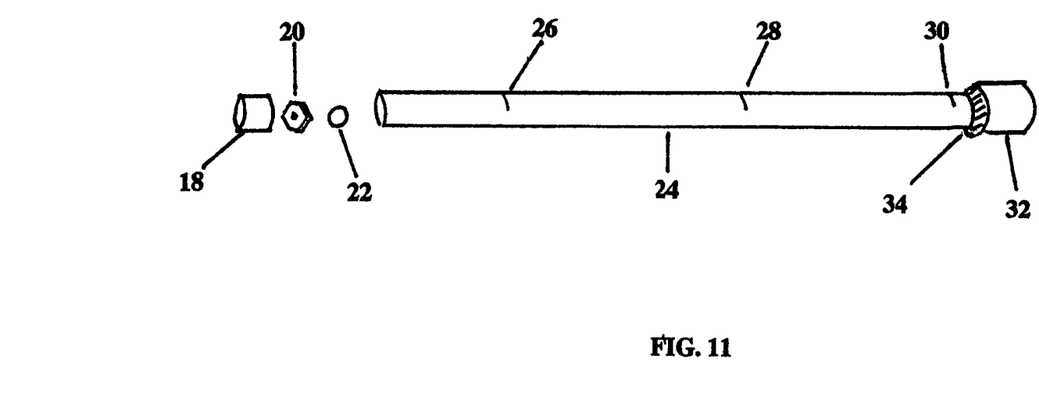
FIG. 11 is an exploded perspective view of a second section of the embodiment of the adjustable fly casting apparatus shown in FIG. 8.

FIG. 11 is an exploded perspective view of the outer tube 24, the friction brake 32, the bottom bushing 34, the long cast marking 30, the middle cast marking 28, the short cast marking 26, the ball 22, the stop nut 20, and the end cap 18. The brake 32 and inner bushing 34 are shown attached to the outer tube 24. As described above, the outer tube 24 may be a clear polycarbonate allowing the casting student to observe the ball 22 rolling forward to strike stop nut 20 at which time the student will hear the ball 22 click upon the stop nut 20. Both the stop nut 20 and the end cap 18 may be glued into place while the ball 22 free to roll inside the outer tube 24. Short, middle, and long cast markings 26 28 30 respectively mark where the end of the piston shaft 40 should be when practicing short, medium or long casts. These markings are optional, and the user may adjust the position of the piston shaft 40 relative to the outer tube 24 continuously along the length of the piston shaft 40 between the long and short cast adjustment setting (that is, the user need not be restricted to discrete cast adjustment settings). The friction brake 32 allows the outer tube 24 to slide up and down the piston shaft 40 and hold to it in each designated position as well as any position in-between the short cast marking 26 and the long cast marking 30.

According to this embodiment of the invention, the end cap 18 may be glued or otherwise fixed (e.g. press fit) onto the outer tube 24. Under the end cap 18 and inside the outer tube 24, the stop nut 20 is glued. The stop nut 20 will provide a click sound when the ball 22 hits it. The ball 22 is seen through the polycarbonate tube 24. The stop screw 38 on the distal end of the piston shaft 40 may be seen through the polycarbonate outer tube 24 and will provide another clicking sound when the ball 22 hits it. The top bushing 36 allows the piston shaft 40 to glide smoothly without wobbling within the outer tube 24. The bottom bushing 34 also helps the bottom of the piston shaft 40 to glide smoothly without wobbling within the outer tube 24. The brake 32 allows the piston shaft 40 to stay in a given position within the outer tube 24

Figure 12:
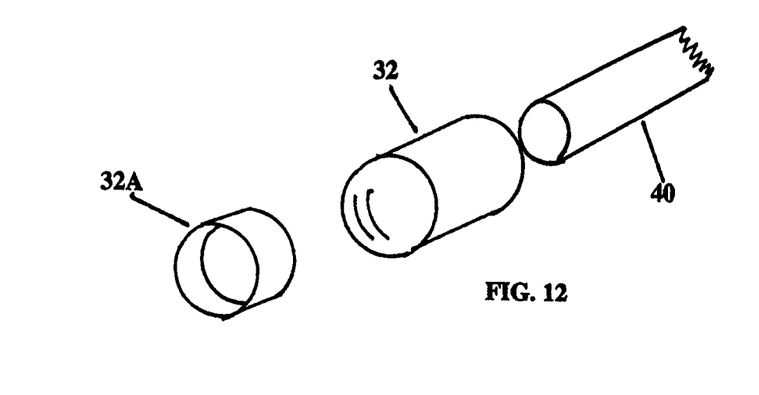
FIG. 12 is an exploded perspective drawing of the friction brake, inner tube, and piston shaft of the embodiment shown in FIG. 8.

FIG. 12 is a blown up perspective drawing of the piston brake showing the outer cylinder 32 of the braking system with the softer cork or plastic inner cylinder 32A of the braking system. The piston shaft 40 is inserted into the inner cylinder 32, which is inserted into the outer cylinder 32. Insertion of the inner cylinder 32A allows the brake to hold the piston shaft 40 in a given position relative to the outer tube 24.

Figure 13:
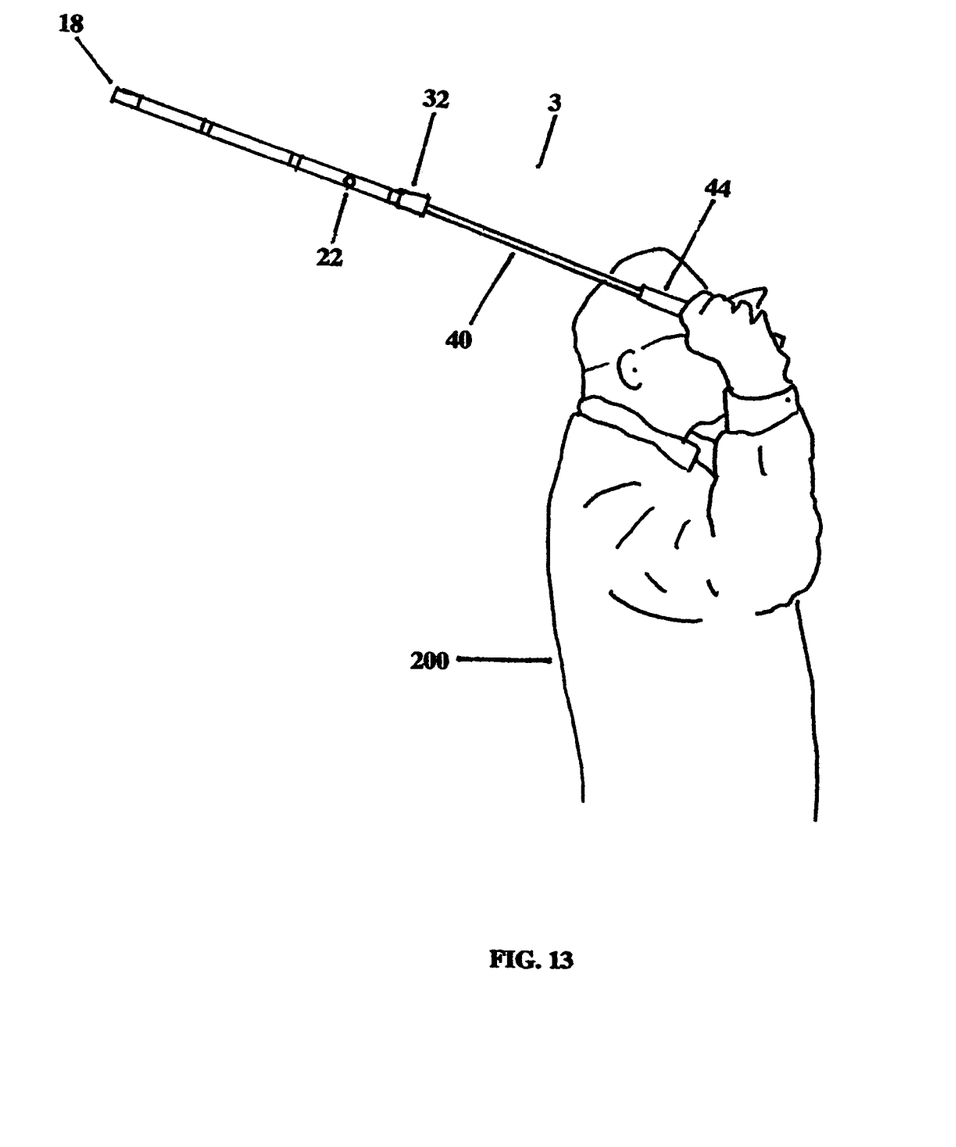
FIG. 13 is an exemplary sketch of an embodiment of the adjustable multi-sensory fly casting trainer being used in a back cast in the long cast adjustment setting.

FIG. 13 shows a user 200 with the adjustable fly casting trainer 3 being used in a back cast in the long cast adjustment setting 30. With the long cast adjustment setting, the user must back cast and provide enough energy, and allow enough time for the ball 22 to travel the complete distance to the end cap 18 (which will create an audible click), and then allow the ball 22 to travel back to reach the distal end of the piston shaft 40.

Figure 14:
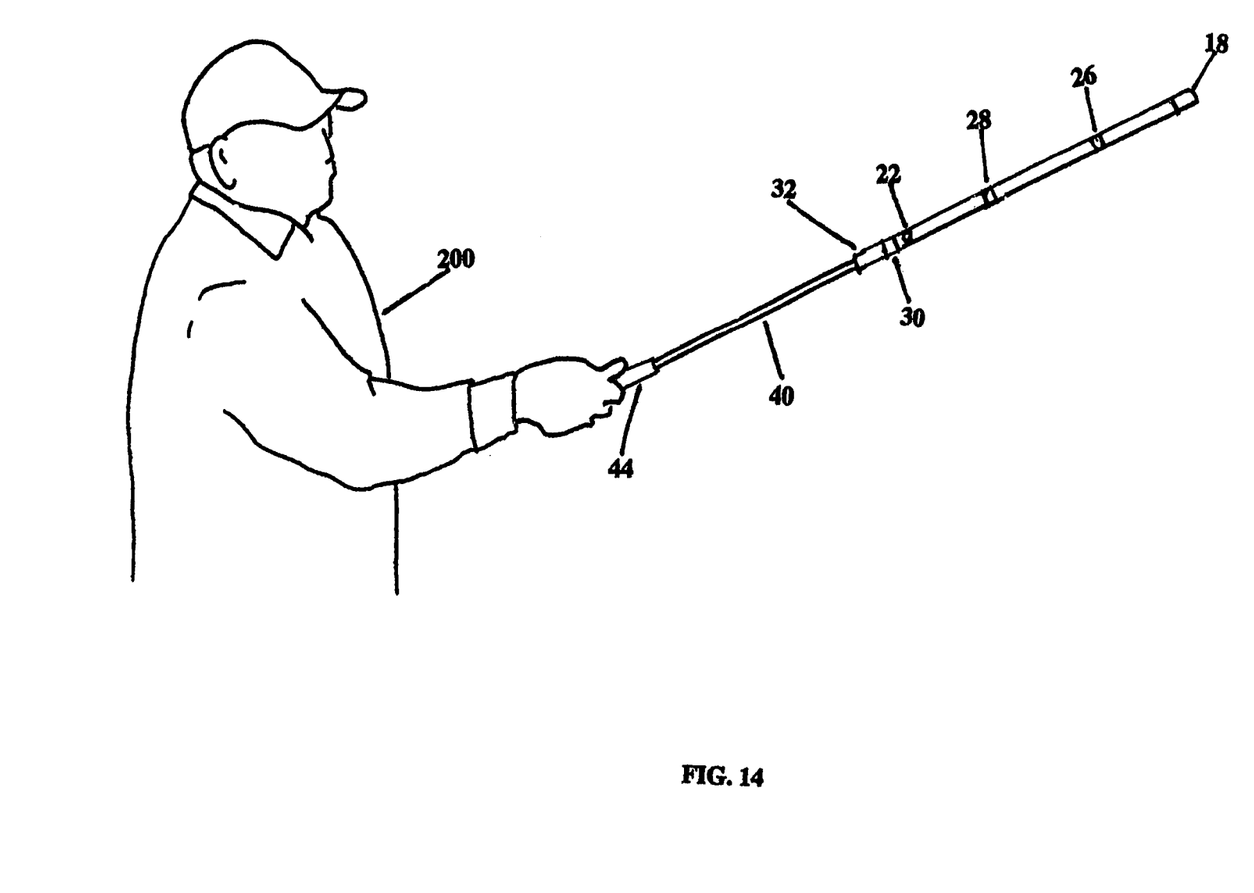
FIG. 14 is an exemplary sketch of an embodiment of the adjustable, multi-sensory fly casting trainer being used in the forward cast in the long cast adjustment setting.

FIG. 14 is an exemplary sketch of an embodiment of the adjustable, multi-sensory fly casting trainer 3 being used in the forward cast in the long cast adjustment setting 30. Similarly, on the forward cast with the long cast setting 30, the user 200 must provide the proper casting motion to impart enough energy for the ball 22 to reach the distal end of the outer tube 24 and allow enough time for the ball 22 to travel to the distal end (and the user 200 will hear a first click, as well as being able to see the ball 22 traveling forward on the forward cast). The user must then allow enough time for the ball 22 to return back to the distal end of the piston shaft 40 (and the user will hear a second click) before beginning the back cast.

Figure 15:
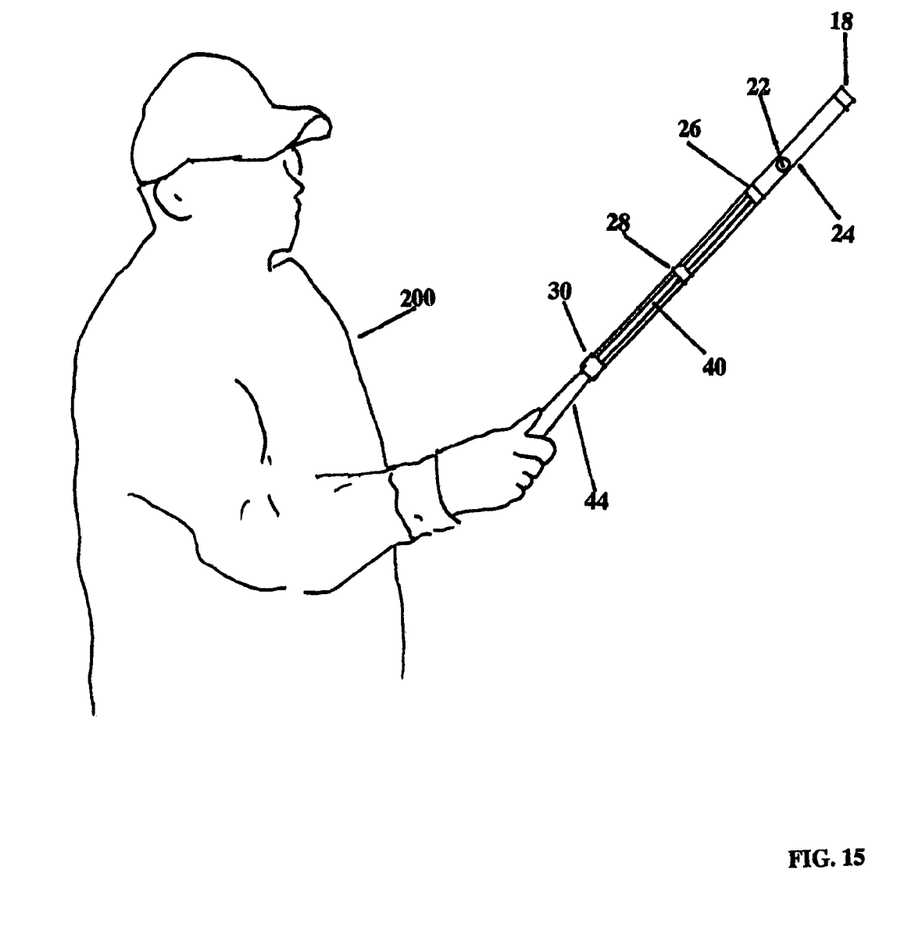
FIG. 15 is an exemplary sketch of an embodiment of the adjustable, multi-sensory fly casting trainer being used in the forward cast in the short cast adjustment setting.

FIG. 15 is an exemplary sketch of an embodiment of the adjustable, multi-sensory fly casting trainer being used in the forward cast in the short cast adjustment setting. As can be seen by comparison of FIG. 15 and FIG. 14, the distance that the ball 22 travels to reach the stops 20, 38 are much shorter for the short cast adjustment setting, and thus the fly casting trainer 3 simulates a shorter cast.

Figure 16:
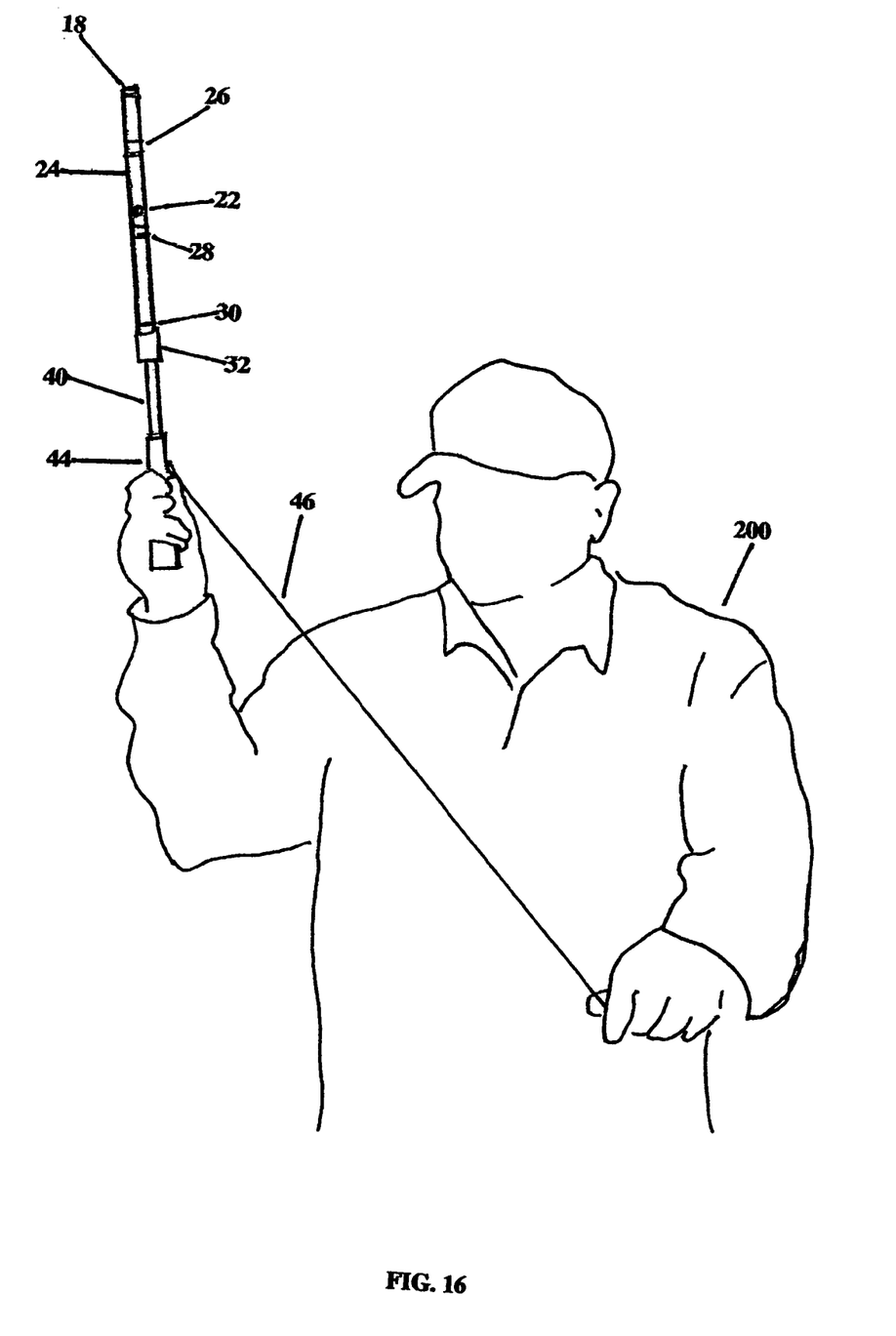
FIG. 16 is an exemplary sketch of an embodiment of the present invention being used in the medium adjustment setting in the backstroke using the elastic bands to practice the double haul during the pull down period of the line hand action in the double haul.

FIG. 16 is an exemplary sketch of an embodiment of the present invention being used in the medium adjustment setting in the backstroke using the elastic bands 46 to practice the double haul during the pull down period of the line hand action in the double haul.

Figure 17:
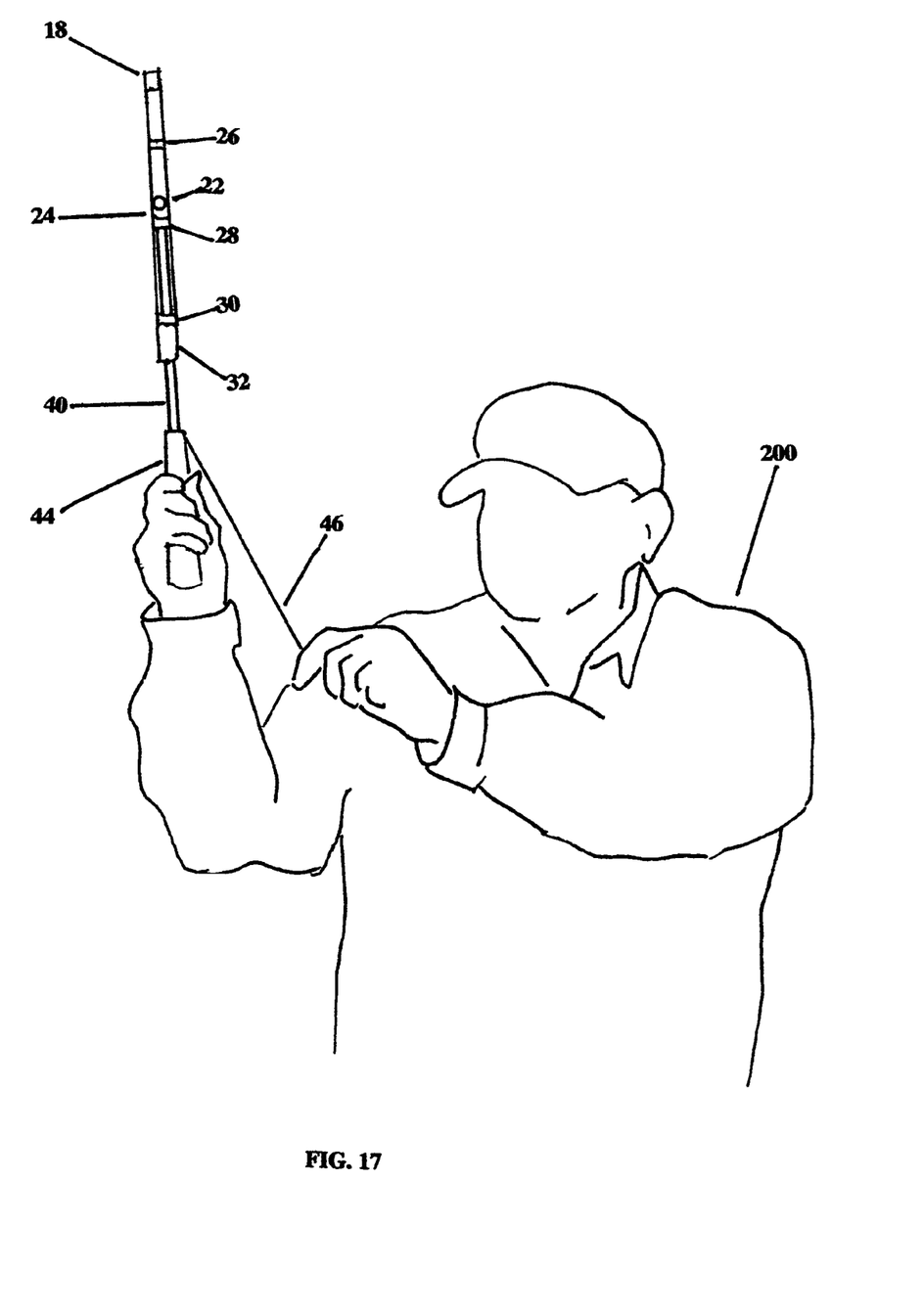
FIG. 17 is an exemplary sketch of an embodiment of the present invention being used in the medium adjustment setting in the backstroke using the elastic bands to practice the double haul during the up period of the line hand action in the double haul.

FIG. 17 shows an embodiment of the present invention being used in the medium adjustment setting in the backstroke using the elastic bands to practice the double haul during the up period of the line hand action in the double haul. In FIG. 16 the elastic band 46 is stretched by the user 200, which simulates putting a load on a fly rod during the double haul motion, and in FIG. 17 the elastic band 46 is relaxed or released from tension by the user 200 which simulates releasing the line into the cast in the double haul casting method.

The present invention includes the method of using the above-described adjustable, multi-sensory fly casting trainer to teach the fly-casting stroke. The desired stroke is described through written material, DVD, on-line classes, or live demonstration. The fly casting student then practices, until able to achieve the two auditory clicks that indicate a proper transfer of energy and timing in the casting motion. Once the student is able to make two clicks in each stroke with the adjustable, multi-sensory fly casting trainer in the short stroke position, it will be appropriate to adjust the tubing to the medium stroke position. When two clicks are achieved in the medium position, it will be appropriate to adjust the tubing into the long cast position. When two clicks are achieved in both the forward and backward stroke in the long cast position, it will be appropriate to begin practicing the double haul movements in the short cast position. The student will then proceed to medium and then long cast positions while practicing the timing of the double haul in both the forward and back cast. Since, in actual fly casting, the caster must wait while the fly line unrolls behind before moving into the forward cast, waiting for the ball to click the second time teaches that timing. Since a smooth double haul requires that a caster allow the energy of the fly line moving up through the guides to feed the slack on both the forward and back cast, following the timing of the ball as it rolls forward and back teaches the timing of that transfer of energy.

In the preferred polycarbonate embodiment, the clear tubing allows the student to see and hear the metal ball rolling back after the first click in an equal and opposite reaction to the energy imparted through the acceleration and stop of the casting stroke. The trainer is adjustable to simulate casting various lengths of fly line by sliding the tubing up or down to the marked positions on the trainer indicating short, medium or long casts. The rolling of the ball within the tubing after the click or stop tells the student the timing of the double haul. The student begins the double haul by pulling down on the elastic material at the sound of the ball rolling towards the top end of the trainer. The haul should be fully extended down when the first click is heard and felt. The casting student then moves the elastic material up at the same speed and timing of the ball as it rolls to the second click position. This is repeated in both the forward and backward stroke. Ideally, unless a curve cast is desired, the fly casting stroke should travel in a straight path to maximize distance and accuracy in delivering the fly to the fish. It is beneficial, therefore, for the student to occasionally practice using the adjustable fly casting trainer while standing close to a wall so that his/her hand will not travel in and out of plane during the casting stroke. Once the basic casting stroke is mastered, it will be possible for the caster to practice casting on all planes from horizontal on the right to vertical to horizontal on the left. When casting to the left, (for right handed people) it will be necessary to turn the palm of the hand away from the body. This will give the caster an adaptable stroke that will be advantageous when fly-fishing in various wind and water situations.

Having now fully set forth a detailed example and certain modifications incorporating the concept underlying the present invention, various other modifications will obviously occur to those skilled in the art of fly-casting upon becoming familiar with said underlying concept. For example, any of the above-described embodiments can be attached to a fly rod or any parts of a fly rod or reel could be attached to the adjustable multi-sensory fly casting trainer. It would also be possible to make a similar energy transfer device that is not adjustable or one where the moving parts are on the outside of a rod rather than the inside. It is to be understood, therefore, that within the scope of the appended claims, the invention may be practiced otherwise than as specifically set forth in the appended claims.

What is claimed is:

1. A fly casting training apparatus for simulating fly casting comprising:
    an elongated body having an axis, a proximal end, and a distal end, the proximal end suitable for gripping, said elongated body having the approximate weight of a fly rod;
    a movable member movably coupled to the elongated body, wherein the movable member translates substantially axially along the elongated body;
    a first stop mechanism coupled to the elongated body, the first stop mechanism limiting the translation of the movable member in the proximal direction of axial movement of the movable body;
    a second stop mechanism coupled to the elongated body, the second stop mechanism limiting the translation of the movable member in the proximal direction of axial movement of the movable body;
    wherein a fly casting motion performed on the fly casting training apparatus causes movement of the moveable member relative to the elongated body.

2. The fly casting training apparatus of claim 1, wherein the first stop mechanism and the second stop mechanism are comprised of a hard material such that movement of the moveable member into contact with the first stop mechanism and the second stop mechanism provides an audible feedback to a user.

3. The fly casting training apparatus of claim 1, wherein the movable member slides on an outer surface of the elongated body.

4. A fly casting training apparatus for simulating fly casting comprising:
    an elongated body having an axis, a proximal end, and a distal end, the proximal end suitable for gripping;
    a movable member movably coupled to the elongated body, wherein the movable member translates substantially axially along the elongated body;
    a first stop mechanism coupled to the elongated body, the first stop mechanism limiting the translation of the movable member in the proximal direction of axial movement of the movable body;
    a second stop mechanism coupled to the elongated body, the second stop mechanism limiting the translation of the movable member in the proximal direction of axial movement of the movable body;
    an elastic band attached to the proximal end of the elongated body, the elastic band usable to simulate a double haul casting technique;
    wherein a fly casting motion performed on the fly casting training apparatus causes movement of the moveable member relative to the elongated body.

5. The fly casting training apparatus of claim 4, wherein:
    the elongated body is hollow defining an outer surface and an inner area, the elongated body having a gap in the outer surface running parallel to the axis of the elongated body; and
    the first stop mechanism comprises:
    an outer body disposed outside shaped to substantially fit the outer surface of the elongated body and adjustably moves axially along the elongated body;
    an inner body shaped to substantially match the inner area of the elongated body and disposed within the elongated body; and
    a connector section that connects the outer body to the inner body, the connector section disposed in the gap of the elongated body.

6. The fly casting training apparatus of claim 1, wherein:
    the first stop mechanism is adjustably positionable along the axis of the elongated body.

7. The fly casting training apparatus of claim 6, wherein the outer body of the first stop mechanism is shaped to substantially fit the outer surface of the elongated body.

8. The fly casting training apparatus of claim 6, further comprising a rod attached substantially parallel to the elongated body, wherein the outer body of the first stop mechanism is adapted to connect to the rod, and the first stop mechanism is adjustably positionable along the axis of the rod.

9. An adjustable fly casting trainer apparatus comprising:
    a piston shaft having a proximal end and a distal end;
    an outer tube having a proximal end and a distal end, the proximal end of the outer tube receiving the distal end of the piston shaft, the distal end of the outer tube having a stop mechanism;
    a movable member movably coupled to the outer tube, wherein the moveable member may translate along the axis of the outer tube in the distal and proximal directions, where the movable member is limited from movement in the proximal direction by the distal end of the piston shaft, and the movable member is limited from movement in the distal direction by the stop mechanism,
    wherein the weight of the adjustable fly casting trainer apparatus approximates the weight of a fly rod.

10. The adjustable fly casting trainer apparatus of claim 9, wherein
    the piston shaft is telescopically coupled to the outer tube such that the piston shaft may be adjusted into and out of the outer tube, thereby adjusting a distance that the movable member may move relative to the outer tube.

11. The adjustable fly casting trainer apparatus of claim 10 wherein the stop mechanism is an end cap.

12. The adjustable fly casting trainer apparatus of claim 11 wherein the end cap includes a metal nut that serves to provide an audible sound when contacted by the movable member.

13. The adjustable fly casting trainer apparatus of claim 12 wherein the movable member is a ball bearing.

14. The adjustable fly casting trainer apparatus of claim 13 wherein the outer tube is a clear material, such that the ball bearing is visible inside the outer tube.

15. The adjustable fly casting trainer apparatus of claim 10 wherein the piston shaft is coupled to the outer tube with a bushing and a friction break, the bushing providing smooth translation of the piston shaft relative to the outer tube, and the friction break providing secure positioning of the piston shaft relative to the outer tube during use of the apparatus.

* * * * *